United States Patent
Kwon et al.

(10) Patent No.: US 11,157,597 B2
(45) Date of Patent: Oct. 26, 2021

(54) METHOD FOR PROVIDING CLOUD-BASED SERVICE

(71) Applicant: SPARROW CO., LTD, Seoul (KR)

(72) Inventors: Oh Seung Kwon, Yongin (KR); Won Suk Choi, Seoul (KR)

(73) Assignee: Fasoo Co., Ltd., Seoul (KR)

(*) Notice: Subject to any disclaimer, the term of this patent is extended or adjusted under 35 U.S.C. 154(b) by 327 days.

(21) Appl. No.: 16/321,560

(22) PCT Filed: Jul. 28, 2017

(86) PCT No.: PCT/KR2017/008148
§ 371 (c)(1),
(2) Date: Jan. 29, 2019

(87) PCT Pub. No.: WO2018/021864
PCT Pub. Date: Feb. 1, 2018

(65) Prior Publication Data
US 2020/0167445 A1  May 28, 2020

(30) Foreign Application Priority Data

Jul. 29, 2016 (KR) .......... 10-2016-0097511
Sep. 23, 2016 (KR) .......... 10-2016-0122414

(51) Int. Cl.
*G06F 21/00* (2013.01)
*G06F 21/10* (2013.01)
(Continued)

(52) U.S. Cl.
CPC .......... *G06F 21/105* (2013.01); *G06F 21/445* (2013.01); *G06F 21/53* (2013.01); *G06F 21/6218* (2013.01); *G06F 2221/2139* (2013.01)

(58) Field of Classification Search
CPC ...... G06F 21/105; G06F 21/445; G06F 21/53; G06F 21/6218; G06F 2221/2139;
(Continued)

(56) References Cited

U.S. PATENT DOCUMENTS 5,023,907 A * 6/1991 Johnson ................ G06F 21/105
710/200
6,189,103 B1 * 2/2001 Nevarez ................ G06F 21/128
726/5

(Continued)

FOREIGN PATENT DOCUMENTS

JP   2002333928    11/2002
JP   2013020440    1/2013
(Continued)

OTHER PUBLICATIONS

Translation of KR 20130047491, 2013 (Year: 2013).*
International Search Report for PCT/KR2017/008148 dated Nov. 10, 2017.

*Primary Examiner* — John B King
(74) *Attorney, Agent, or Firm* — AJU Kim Chang & Lee

(57) ABSTRACT

A method for providing a software service of a license management server is disclosed. The method comprises the steps of: receiving a virtual machine interface from a cloud server; installing software of a service provider in the virtual machine interface; transmitting a license to the virtual machine interface; providing ID and password related authority to a user terminal; and providing a service of the software to the user terminal through the virtual machine interface when the user terminal accesses the software. Therefore, source code leakage due to static analysis can be fundamentally prevented.

7 Claims, 8 Drawing Sheets

(51) Int. Cl.
*G06F 21/44* (2013.01)
*G06F 21/53* (2013.01)
*G06F 21/62* (2013.01)

(58) Field of Classification Search
CPC .......... G06F 21/10; G06F 15/16; G06F 21/45; G06F 21/6245
See application file for complete search history.

(56) References Cited

U.S. PATENT DOCUMENTS

| | | | | |
|---|---|---|---|---|
| 2002/0161996 | A1* | 10/2002 | Koved | G06F 21/52 713/150 |
| 2003/0101264 | A1* | 5/2003 | Yamada | G06F 21/53 709/225 |
| 2010/0241749 | A1* | 9/2010 | Rasmussen | H04L 51/046 709/226 |
| 2010/0332629 | A1 | 12/2010 | Cotugno et al. | |
| 2011/0047542 | A1* | 2/2011 | Dang | G06F 21/12 718/1 |
| 2012/0042365 | A1* | 2/2012 | Shoval | G06F 21/567 726/7 |
| 2012/0096550 | A1* | 4/2012 | Sapuntzakis | G06F 21/53 726/23 |
| 2012/0131341 | A1 | 5/2012 | Mane et al. | |
| 2012/0317648 | A1* | 12/2012 | Brown | H04L 63/20 726/26 |
| 2013/0124401 | A1* | 5/2013 | Del Real | H04L 63/104 705/39 |
| 2013/0179984 | A1 | 7/2013 | Kumar et al. | |
| 2014/0096208 | A1* | 4/2014 | Buck | G06F 16/176 726/5 |
| 2014/0123292 | A1* | 5/2014 | Schmidt | H04L 67/10 726/25 |
| 2015/0026756 | A1* | 1/2015 | Reddy | H04L 29/06 726/1 |
| 2015/0067871 | A1* | 3/2015 | Commons | H04L 63/10 726/26 |
| 2015/0242600 | A1* | 8/2015 | Ferris | H04L 67/10 726/26 |

FOREIGN PATENT DOCUMENTS

| | | | |
|---|---|---|---|
| JP | 2013-0526742 A | 6/2013 | |
| JP | 2013545152 | 12/2013 | |
| JP | 2014067226 | 4/2014 | |
| JP | 2016506107 | 2/2016 | |
| KR | 20090022831 A * | 3/2009 | |
| KR | 10-2011-0025728 | 3/2011 | |
| KR | 20120093375 A * | 8/2012 | .......... G06F 21/445 |
| KR | 10-2013-0047491 | 5/2013 | |
| KR | 10-2014-0056005 | 5/2014 | |
| WO | WO2011040192 | 4/2011 | |

* cited by examiner

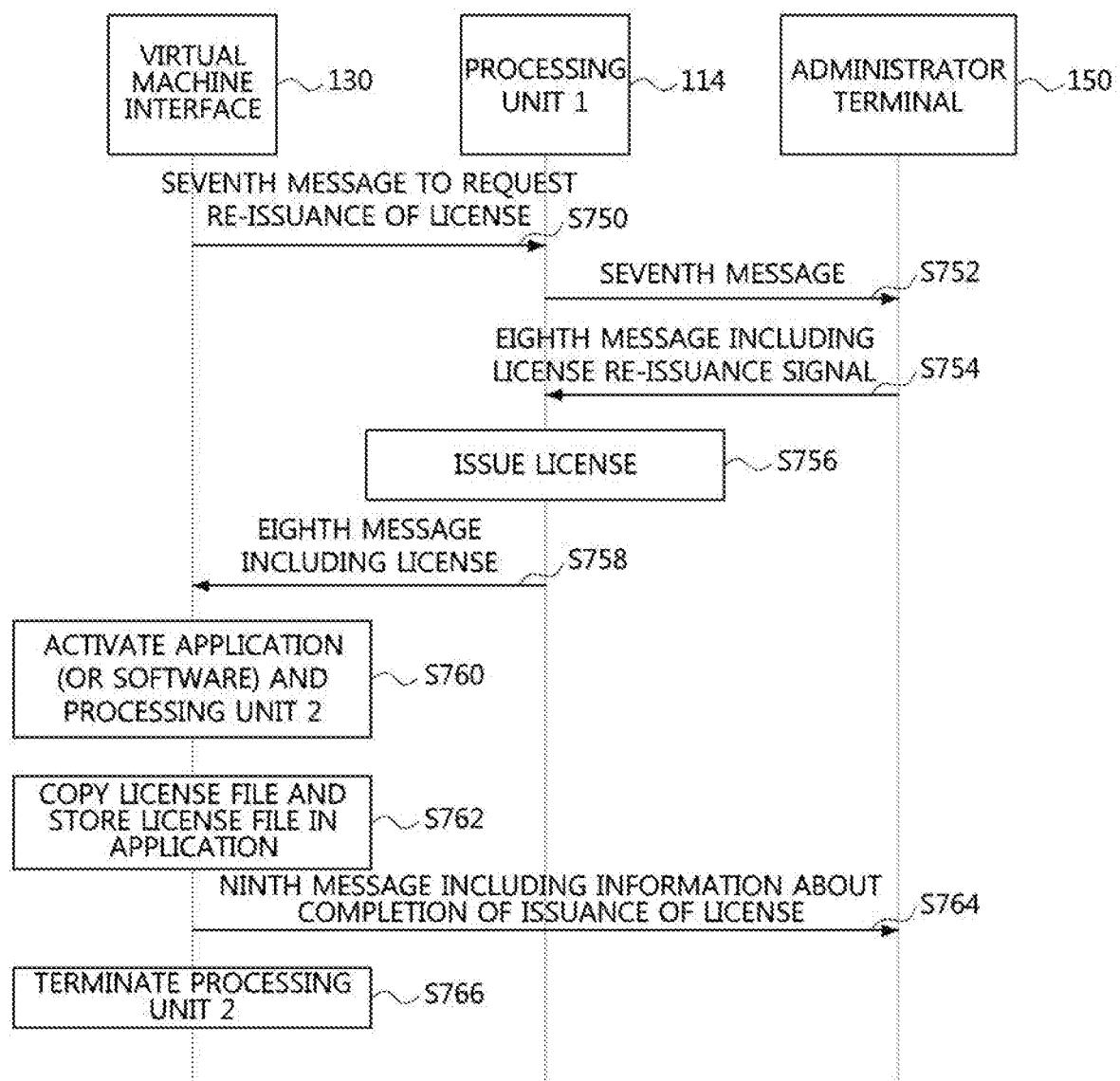

METHOD FOR PROVIDING CLOUD-BASED SERVICE

TECHNICAL FIELD

The present invention relates to a method of providing a cloud-based service, and more specifically, to a method of providing a cloud-based service for preventing source code leakage.

BACKGROUND ART

In order for an application to be executed in a user terminal, a service providing a company's product has to be installed on the basis of an operating system of a cloud providing company. That is, a service provider can run an application-related business by installing a product of the service providing company based on the operating system of the cloud providing company. As a way of executing a service, a user may make a contract with the cloud providing company for infrastructure as a service (IaaS) and make a contract with the service providing company for the product and a license. In this case, the service providing company may install the product in the IaaS for which the user makes a contract, and the user may run an application-related business using the IaaS. Such an approach requires cumbersome processes since the user has to contract with both the cloud providing company and the service providing company.

As another way of executing a service, the service providing company may make a contract with the cloud providing company for the IaaS and make a contract with the user for software as a service (SaaS), and a service provider may run an application-related business using the service. In this case, the cloud providing company has authority for operating a cloud system. A user willing to conduct static analysis desires security for source code. However, there is a problem in that the service providing company is able to intercept all sources of the service providing company that produces an application.

DISCLOSURE

Technical Problem

An objective of the present invention is to solve the above-described problem and to provide a software as a service (SaaS)-based service capable of preventing leakage of user's source code.

Technical Solution

According to one embodiment of the present invention to achieve the above-described objective, a method of providing a software service of a license management server of a service providing company may include receiving a virtual machine interface from a cloud server of a cloud providing company; installing software of the service providing company in the virtual machine interface; providing authority related to an ID and a password to a user terminal; and providing a service of the software to the user terminal through the virtual machine interface when the user terminal accesses the software.

The method may further include transmitting a license for authenticating authority for use of the software to the virtual machine interface in order to authenticate the user terminal for the authority related to the ID and the password.

The authority related to the ID and the password may be provided when a payment for use of the software is made.

The method may further include, when a request for issuance of a new license is received from the user terminal after the license expires, re-providing the authority related to the ID and the password.

When a request for issuance of a new license is not received from the user terminal after the license expires, the ID and the password for accessing the software may be discarded.

The method may further include, prior to the transmitting of the license for authenticating authority for use of the software to the virtual machine interface: receiving a first message including user's membership subscription information from the cloud server and registering the membership subscription information in an issuance request management unit; receiving a second message that indicates new instance information identified by user identification information from the cloud server and updating source instance information stored in a license issuance management unit to the new instance information; transmitting a third message to the cloud server to request an instance unique identifier; receiving the instance unique identifier from the cloud server; updating instance unique identifier information in the issuance request management unit to the instance unique identifier received from the cloud server; and issuing the license through the license issuance management unit.

When the license is transmitted to the virtual machine interface, a fourth message that indicates completion of issuance of the license may be received from the virtual machine interface.

According to one embodiment of the present invention to achieve the above-described objective, a license management server may include a processor and a database in which at least one command to be executed by the processor is stored, wherein the at least one command is executable to receive a virtual machine interface from a cloud server of a cloud providing company, install software of the service providing company in the virtual machine interface, provide authority related to an ID and a password to a user terminal, and provide a service of the software to the user terminal through the virtual machine interface when the user terminal accesses the software.

The at least one command may be further executable to transmit a license for authenticating authority for use of the software to the virtual machine interface in order to authenticate the user terminal for the authority related to the ID and the password.

The authority related to the ID and the password may be provided when a payment for use of the software is made.

The at least one command may be executable to re-provide the authority related to the ID and the password when a request for issuance of a new license is received from the user terminal after the license expires.

The at least one command may be executable to discard the ID and the password for accessing the software when a request for issuance of a new license is not received from the user terminal after the license expires.

The at least one command may be further executable to, prior to the transmittance of the license for authenticating authority for use of the software to the virtual machine interface, receive a first message including user's membership subscription information from the cloud server and register the membership subscription information in an issuance request management unit, receive a second message that indicates new instance information identified by user identification information from the cloud server and update source instance information, which is stored in a license issuance management unit, to the new instance information, transmit a third message to the cloud server to request an instance unique identifier, receive the instance unique identifier from the cloud server, update instance unique identifier information in the issuance request management unit to the instance unique identifier received from the cloud server, and issue the license through the license issuance management unit.

The at least one command may be further executable to receive a fourth message that indicates completion of issuance of the license from the virtual machine interface when the license is transmitted to the virtual machine interface.

Advantageous Effects

According to the present invention, although a service is used based on software as a service (SaaS), a user has authority for control over infrastructure as a service (IaaS), and thus it is possible to achieve advantages of SaaS and advantages of IaaS.

Specifically, according to the present invention, it is possible to achieve all of the advantages of SaaS, in which a customized service can be provided through settings suitable for each customer and hardware expansion is easy, and the advantage of IaaS, in which leakage of user's source code can be prevented.

DESCRIPTION OF DRAWINGS

FIG. 10 is a flowchart illustrating a method of re-issuing a license.

BEST MODES OF THE INVENTION

Figure 1:
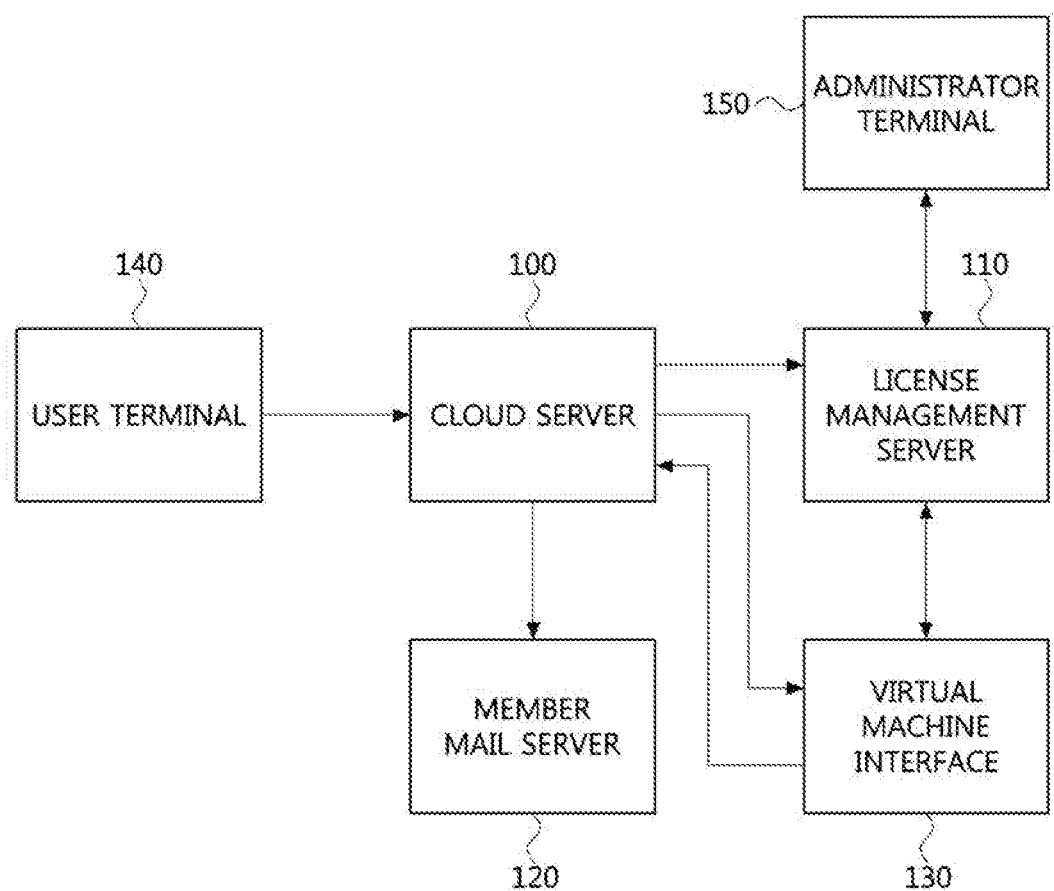
FIG. 1 is a block diagram schematically illustrating a system for supporting issuance of a license according to one embodiment of the present invention.

A method of providing a software service of a license management server of a service providing company according to one embodiment of the present invention may include: receiving a virtual machine interface from a cloud server of a cloud providing company; installing software of the service providing company in the virtual machine interface; providing authority related to an ID and a password to a user terminal; and providing a service of the software to the user terminal through the virtual machine interface when the user terminal accesses the software.

A license management server according to one embodiment of the present invention may include a processor and a database in which at least one command to be executed by the processor is stored, wherein the at least one command is executable to receive a virtual machine interface from a cloud server of a cloud providing company, install software of the service providing company in the virtual machine interface, provide authority related to an ID and a password to a user terminal, and provide a service of the software to the user terminal through the virtual machine interface when the user terminal accesses the software.

Modes of the Invention

Since the present invention may be modified in various forms and may have various embodiments, the following exemplary embodiments are illustrated in the accompanying drawings and are described in detail with reference to the drawings. However, this is not intended to limit the present invention to specific embodiments, and the present invention should be construed to encompass various changes, equivalents, and substitutions within the technical scope and spirit of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any one or a combination of a plurality of the associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, example embodiments of the present invention will be described in detail with reference to the accompanying drawings. To assist in gaining comprehensive understanding of the invention, like reference numerals in the drawings denote like elements and redundant description on like elements will not be repeated. Example embodiments of the present invention will be herein described in detail with reference to the accompanying drawings.

FIG. 1 is a block diagram schematically illustrating a system for supporting issuance of a license according to one embodiment of the present invention.

Referring to FIG. 1, the system for supporting issuance of a license may include a cloud server 100, a user terminal 140, a license management server 110, an administrator terminal 150, a member mail server 120, a virtual machine (VM) interface 130, and the like. The VM interface 130 may be infrastructure as a service (IaaS), VM instance, or the like.

The cloud server 100 may be connected to the user terminal 140, the license management server 110, and the member mail server 120 through a wired network or a wireless network. For example, the cloud server 100 may communicate with the user terminal 140, the license management server 110, and the member mail server 120 by long term evolution (LTE), LTE-advanced (LTE-A), or the like, which is defined by 3rd generation partnership project (3GPP) standards.

Alternatively, the cloud server 100 may be connected to the user terminal 140, the license management server 110, and the member mail server 120 through a wireless local area network (WLAN), a wireless personal area network (WPAN), or the like, which is defined by Institute of Electrical and Electronics Engineers (IEEE) standards.

The cloud server 100 may be connected to the user terminal 140, the license management server 110, and the member mail server 120 through a wired LAN or the like. The license management server 110 may be connected to the cloud server 100 and the administrator terminal 150 through a wired network or a wireless network.

The cloud server 100 may receive information necessary for issuance of a license from the user terminal 140, the license management server 110, and the member mail server 120 and perform an operation for executing an application on the basis of the received information. In this case, the application may be software.

The user terminal 140 and the license management server 110 may transmit the information necessary for issuance of a license to the cloud server 100.

The user terminal 140 may be a desktop computer capable of communication, a laptop computer, a tablet personal computer (PC), a wireless phone, a mobile phone, a smartphone, a smart watch, smart glasses, an e-book reader, a portable multimedia player (PMP), a portable game console, a navigation system, a digital camera, a digital multimedia broadcasting (DMB) player, a digital audio recorder, a digital picture recorder, a digital picture player, a digital video recorder, a digital video player, or the like.

The VM interface 130 may be software operated in the cloud server 100.

Figure 2:
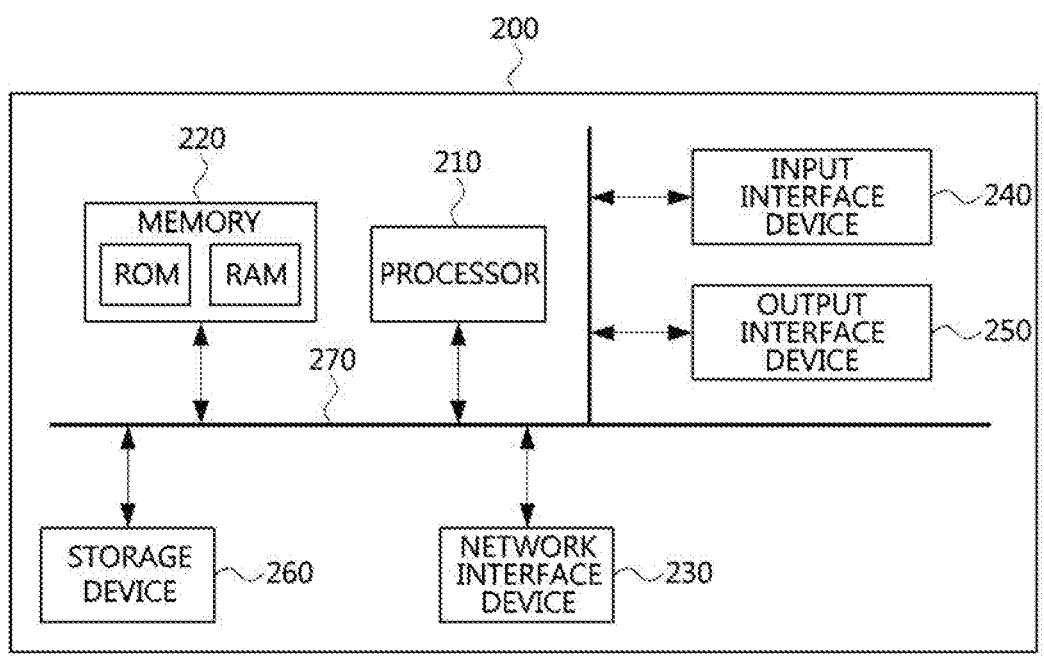
FIG. 2 is a block diagram illustrating a node constituting a system for supporting issuance of a license according to one embodiment of the present invention.

FIG. 2 is a block diagram illustrating a node constituting a system for supporting issuance of a license according to one embodiment of the present invention.

Referring to FIG. 2, a node 200 may include at least one processor 210, a memory 220, and a network interface device 230 connected to a network for communication. In addition, the node 200 may further include an input interface device 240, an output interface device 250, a storage device 260, and the like.

In this case, the node 200 may be the user terminal 140, the cloud server 100, the license management server 110, the administrator terminal 150, the member mail server 120, or the like, which is described with reference to FIG. 1. The components included in the node 200 may be connected via a bus 270 and communicate with each other.

The processor 210 may execute program commands stored in the memory 220 and/or the storage device 260. The processor 210 may refer to a central processing unit (CPU), a graphics processing unit (GPU), or a dedicated processor in which methods according to the present invention are performed.

The memory 220 and the storage device 260 may be configured with a volatile storage medium and/or a non-volatile storage medium. For example, the memory 220 may be configured with a read only memory (ROM) and/or a random access memory (RAM).

In addition, even when a method (e.g., transmission or reception of a message) performed in a first node among the above-described nodes is described, a second node may perform a method (e.g., transmission or reception of a message) corresponding to the method performed in the first node.

That is, in a case where an operation of the cloud server 100 is described, the license management server 110 corresponding to the cloud server 100 may perform an operation corresponding to the operation of the cloud server 100. On the other hand, in a case where an operation of the license management server 110 is described, the cloud server 100 corresponding to the license management server 110 may perform an operation corresponding to the operation of the license management server 110.

Figure 3:
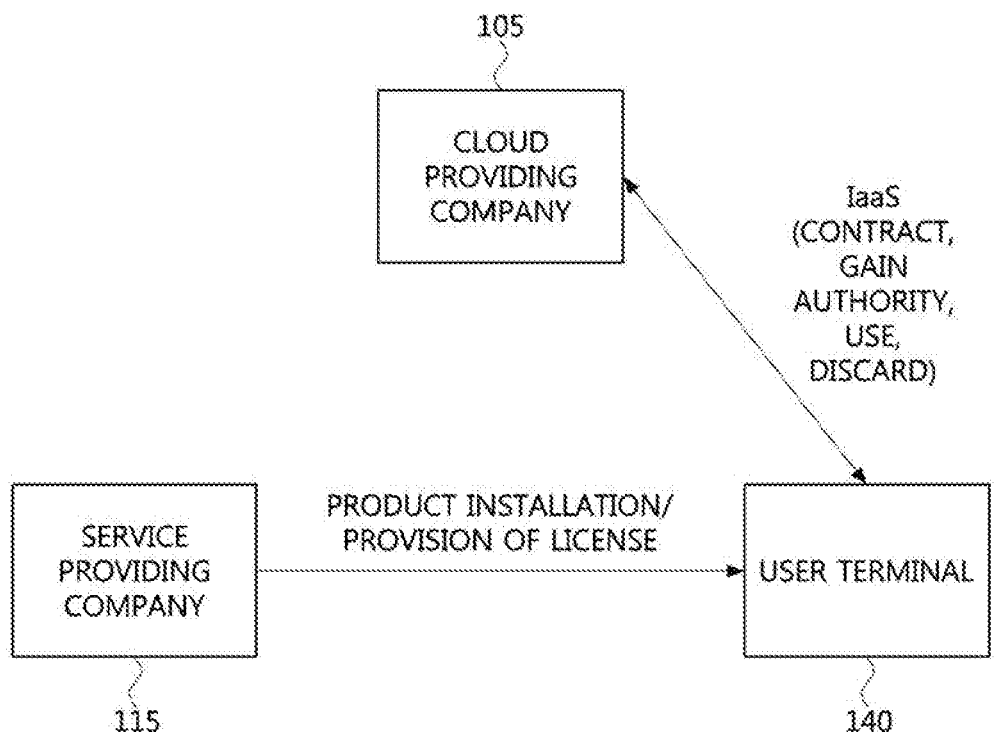
FIG. 3 is a block diagram for describing the use of infrastructure as a service (IaaS).

FIG. 3 is a block diagram for describing the use of IaaS.

Referring to FIG. 3, a general IaaS use relationship is described. IaaS may mean that a service is provided to allow an infrastructure resource to be used as needed by providing a server, a storage device, and a network as a virtualized environment. The IaaS may be a VM interface 130.

The user terminal 140 may purchase an IaaS from a cloud providing company 105. That is, the user terminal 140 may make a contract with the cloud providing company 105 for IaaS and obtain authority for control and use of the IaaS from the cloud providing company 105.

The user terminal 140 may receive a product and a license of a service providing company 115 from the service providing company 115. The product of the service providing company 115 may be an application. Specifically, the product of the service providing company 115 may be an application that statically analyzes developer's source code. The user terminal 140 may be authorized to use the product of the service providing company 115 through the license provided from the service providing company 115.

Figure 6:
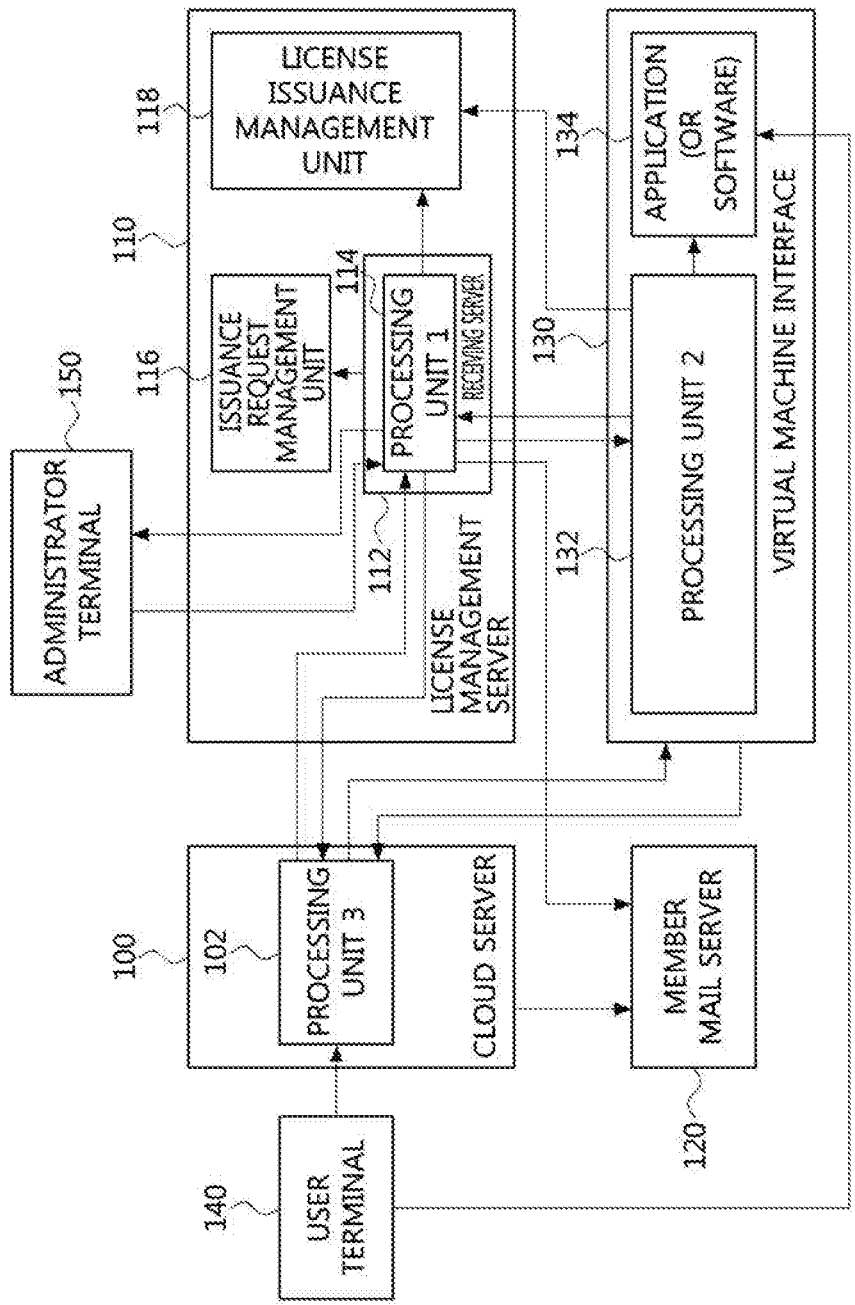
FIG. 6 is a detailed block diagram illustrating a system for supporting the issuance of a license.

The service providing company 115 may be a company that operates the license management server 110 described in FIG. 6. In addition, the cloud providing company 105 may be a company that operates the cloud server described in FIG. 6. The service providing company 115 may install the product of the service providing company 115 in the IaaS purchased by the user terminal 140.

When the license period of the user terminal 140 expires, the cloud providing company 105 may check whether the user terminal 140 intends to extend the license. When the cloud providing company 105 confirms that the user terminal 140 intends to extend the license, the cloud providing company 105 may re-issue or extend the license through the service providing company 115.

When the cloud providing company 105 confirms that the user terminal 140 does not intend to extend the license, the cloud providing company 105 may discard the license through the service providing company 115.

Figure 4:
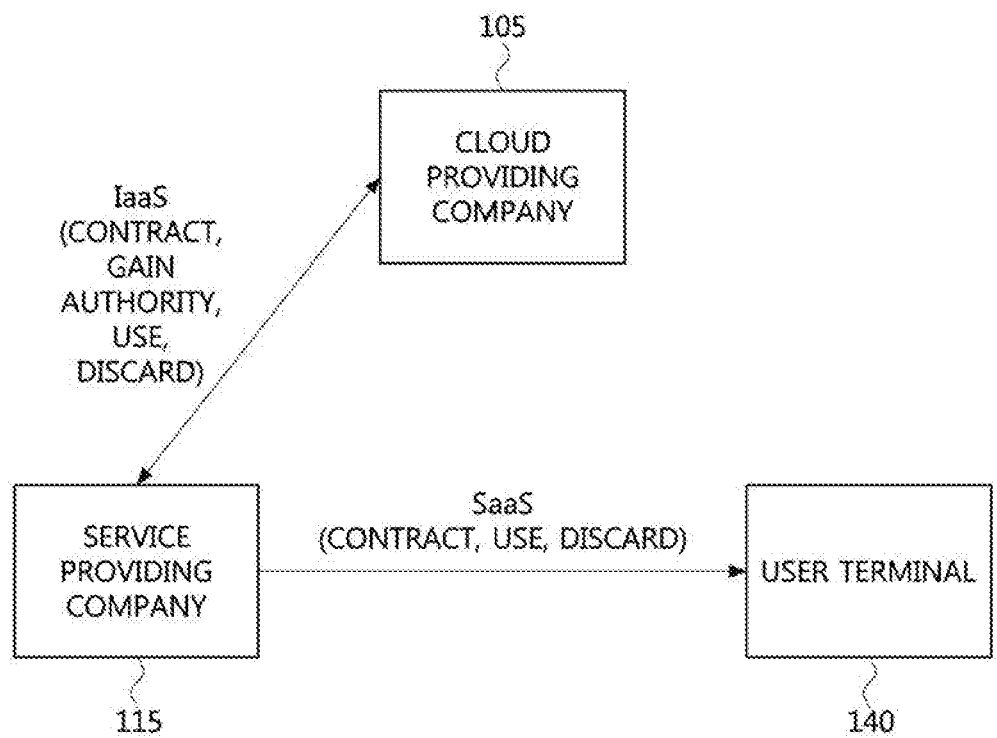
FIG. 4 is a block diagram for describing the use of software as a service (SaaS).

FIG. 4 is a block diagram for describing the use of software as a service (SaaS).

Referring to FIG. 4, a general SaaS use relationship is described. SaaS may mean cloud-based software. The service providing company 115 may purchase IaaS from the cloud providing company 105. That is, the service providing company 115 may make a contract with the cloud providing company 105 for the IaaS and may obtain authority for control and use of the IaaS from the cloud providing company 105.

The user terminal 140 may make a contract with the service providing company 310 for the SaaS. The user terminal 140 may use a product of the service providing company 115 through the IaaS of the service providing company 115 without needing to separately install software or an application. That is, the user terminal 140 may obtain authority for use of the IaaS from the service providing company 115.

When the license period of the user terminal 140 expires, the service providing company 115 may check whether the user terminal 140 indents to extend the contract. When the service providing company 115 confirms that the user terminal 140 intends to extend the contract, the service providing company 115 may extend the term of the contract.

When the cloud providing company 105 confirms that the user terminal 140 does not intend to extend the contract, the cloud providing company 105 may discard the authority for use.

Figure 5:
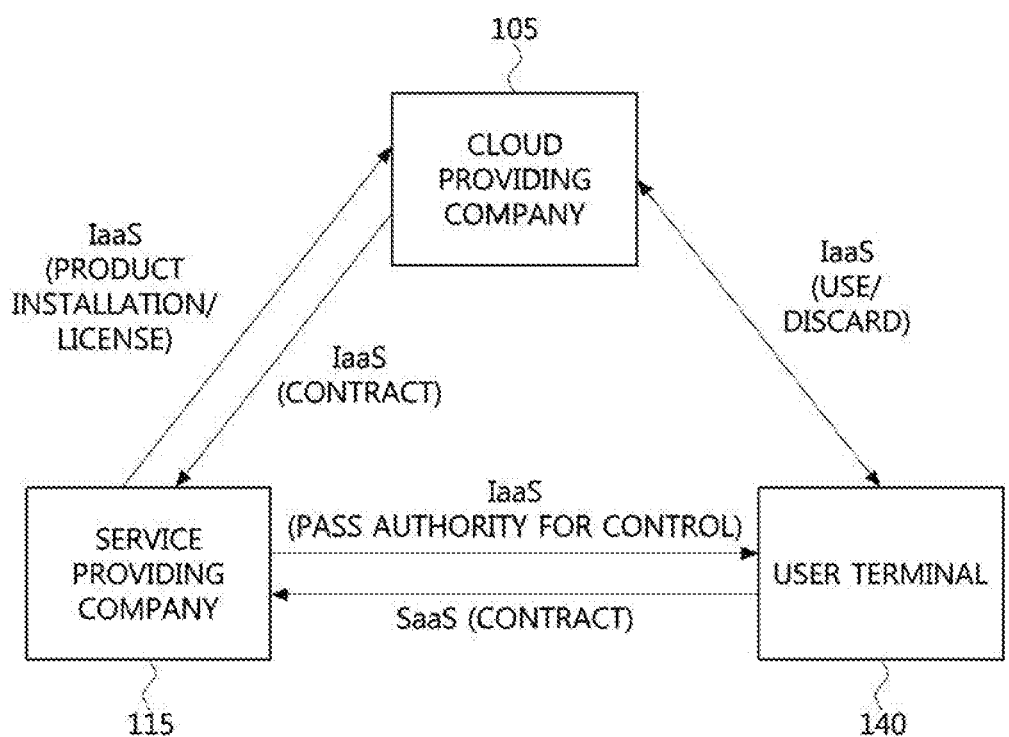
FIG. 5 is a block diagram for describing the use of IaaS-SaaS.

FIG. 5 is a block diagram for describing the use of IaaS-SaaS.

Referring to FIG. 5, an intermediate between IaaS and SaaS is described. The service providing company 115 may purchase IaaS from the cloud providing company 105. That is, the service providing company 115 may make a contract with the cloud providing company 105 for the IaaS. In this case, the user terminal 140 may be allowed to obtain authority for control of the IaaS from the cloud providing company 105.

The user terminal 140 may make a contract with the service providing company 115 for a SaaS. The user terminal 140 may use a product of the service providing company through the IaaS of the service providing company 115 without needing to separately install software or an application. That is, the user terminal 140 may obtain authority for use of the IaaS from the service providing company 115.

In this case, the user terminal 140 may obtain both control authority and authority for use of the IaaS. On the other hand, the service providing company 115 may not have both control authority and authority for use of the IaaS. Therefore, since all control authority over the IaaS is given to a user, the service providing company 115 cannot intercept the user's source code.

The service providing company 115 may install the product and license of the service providing company 115 in the purchased IaaS. The product of the service providing company 115 may be a static analysis tool which accurately detects security flaws and defects that occur when a program is executed and that are hard to find by only parsing source code on the basis of an execution semantic analysis engine.

The service providing company 115 may install the product of the service providing company 115 in the IaaS in advance. The service providing company 115 may transmit the license for executing the product of the service providing company 115 to the IaaS.

When the license period of the user terminal 140 expires, the service providing company 115 may check whether the user terminal 140 intends to extend the license. When the license of the product of the service providing company 115 expires, the user may re-request the license.

When the service providing company 115 confirms that the user terminal 140 intends to extend the license, the service providing company 115 may re-issue or extend the license. When the service providing company 115 confirms that the user terminal 140 does not intend to extend the license, the service providing company 115 may discard the license.

The service providing company 115 may provide a VM interface equipped with the product of the service providing company 115. The service providing company 115 may provide a product in cooperation with the cloud providing company 105. The user terminal 140 may generate (or activate) the VM interface.

The user terminal 140 may receive the license from the service providing company 115. Since a VM interface control right is held by the user, the service providing company 115 cannot access an ID or password for accessing the VM interface. The user terminal 140 may have the ID or password for accessing the VM interface. The user terminal 140 may use the VM interface.

The user terminal 140 may request the service providing company 115 to provide a VM interface-based service (e.g., SaaS). When provision of the VM interface-based service is requested, the service providing company 115 and the user terminal 140 may discuss a charging plan. The charging plan may be determined on the basis of duration of service use, the number of times of use, frequency of use, and the like.

The service providing company 115 may obtain the IaaS from the cloud providing company 105. The service providing company 115 may receive a signal from the cloud providing company 105 which requests the issuance of a license for installing the product of the service providing company 115.

The license may be issued in a manner identical or similar to those described with reference to FIGS. 7, 8, and 10. When the license is issued, the service providing company 115 may install the license for installing the product of the service providing company 115 in the IaaS. The service providing company 115 may install the product and the license in the IaaS in advance. The IaaS in which the product and the license are installed may be referred to as a SaaS. The SaaS may be generated in a manner identical or similar to the procedure for issuing the license which will be described with reference to FIGS. 7, 8, and 10. The SaaS may be software or an application which is authenticated based on a cloud that issues the license.

The service providing company 115 may provide the SaaS to the user terminal 140. When the SaaS is provided to the user terminal 140, all authority (use, discard, etc.) may be passed to the user terminal 140. In this case, since all control authority over the IaaS is passed to the user terminal 140, the service providing company 115 cannot intercept the source code of the user terminal 140.

The user terminal 140 may use the SaaS. When the license period expires, the user terminal 140 is not allowed to use the SaaS service. When the license period expires, the user terminal 140 may discard the IaaS or the SaaS.

The service providing company 115 may provide a service VM interface equipped with the product of the service providing company 115. The service providing company 115 may provide the product in cooperation with the cloud providing company 105.

The user terminal 140 may generate instance information to be used in generating the VM interface. The user terminal 140 may receive a license from the service providing company 115. Since a VM interface control right is held by the user terminal 140, the service providing company cannot access the VM interface. The user terminal 140 may have an ID or password.

FIG. 6 is a detailed block diagram illustrating a system for supporting the issuance of a license.

Referring to FIG. 6, the system for issuing a license may include a user terminal 140, a cloud server 100, an administrator terminal 150, a member mail server 120, and a VM interface 130.

The cloud server 100 may include processing unit 3 102. A license management server 110 may include a receiving server 112, processing unit 1 114, a subscription request management unit 116, and a license issuance management unit 118. The VM interface 130 may include processing unit 2 132 and an application 134.

The license management server 110 may include the receiving server 112, the processing unit 1 114, the subscription request management unit 116, and the license issuance management unit 118. The receiving server 112 and the processing unit 1 114 may be connected to the cloud server 100 using a wired/wireless communication method. The processing unit 1 114 of the license management server 110 may be a processor that provides support such that a license issuance procedure can be automatically performed. The processing unit 1 114 may be a processor of the receiving server 112. The processing unit 1 114 may be connected to the subscription request management unit 116 and the license issuance management unit 118 in a wired manner.

The processing unit 1 114 may be connected to the processing unit 2 132 of the VM interface 130 using a wired/wireless communication method. The processing unit 1 114 may be connected to the processing unit 2 132 of the VM interface 130 using a wired/wireless communication method. The processing unit 1 114 may be connected to the virtual administrator terminal 150 using a wired/wireless communication method. The license issuance management unit 118 may be connected to the processing unit 2 132 of the VM interface 130 using a wired/wireless communication method.

The VM interface 130 may refer to IaaS. The IaaS may mean that a service is provided to allow an infrastructure resource to be used as needed by providing a server, storage, and a network as virtualized environments. The IaaS may be a VM interface 130.

In addition, the VM interface 130 may have a concept that collectively refers to the virtual processing unit 2 132 and the application 134 formed of software.

The processing unit 2 132 may be connected to the processing unit 3 102 of the cloud server 100 using a wired/wireless communication method. The processing unit 2 132 may execute the application 134. The processing unit 2 132 may be connected to the license issuance management unit 118 and the processing unit 1 114 using a wired/wireless communication method.

The user terminal 140 may access the application 134 through the VM interface 130. The processing unit 2 132 of the VM interface 130 may be a processor that provides support such that a license authentication procedure can be automatically performed.

The cloud server 100 may include the processing unit 3 102 that supports the issuance of a license. The processing unit 3 102 may be connected to the user terminal 140 using a wired/wireless communication method. The processing unit 3 102 may activate the VM interface 130.

The processing unit 3 102 may be connected to the member mail server 120. The processing unit 3 102 may transmit mail related to the license authentication to the member mail server 120 in the course of the license authentication procedure. The processing unit 3 102 may be connected to the user terminal 140 and the cloud server 100 through the interface.

The processing unit 3 102 of the cloud server 100 may transmit and receive a signal to and from the processing unit 2 132 of the VM interface 130. The processing unit 3 102 may be a processor in the cloud server 100 which performs a procedure for issuing a license.

The processing unit 1 114 may monitor whether the receiving server 112 receives a first message including user's membership subscription information from the cloud server 100 connected to the terminal or a second message indicating new instance information identified by user identification information from the cloud server 100.

When the receiving server 112 receives the first message or the second message, the processing unit 1 114 may obtain the first message or the second message from the receiving server 112. When the processing unit 1 114 obtains the first message or the second message from the receiving server 112, the processing unit 1 114 may store the first message or the second message in a database included in the license management server 110.

In addition, when the issuance of a license is completed, the processing unit 1 114 may store the issued license in the database included in the license management server 110. Specifically, the processing unit 1 114 may store the first message, the second message, and a fourth message in the database of the license management server 110. When the license is stored, the processing unit 1 114 may store the license together with the time of issuance of the license and the user identification information in the database included in the license management server 110. The database may later generate big data about the access of the user terminal 140 to the application 134 on the basis of the stored information.

The database may support an application program interface (API). Each of the cloud server 100, the license management server 110, and the VM interface 130 may include a database in which information can be stored. The processing unit 2 132 may store a fifth message including information about the completion of issuance of the license in the database of the VM interface 130.

In order for the processing unit 3 102 to obtain the user identification information, a user or the like may be required to register or log in. The user or the like may access the cloud server 100 to register or log in. When the user or the like may register in the cloud server 100 as a member, the user or the like may input the user identification information to the cloud server 100. In this case, the processing unit 3 102 may easily obtain the user's identification information as long as the user logs on.

Even in a case where the user does not register as a member, the procedure for issuing a license may be performed by inputting the user identification information. In the case of a user registered as a member, the identification information may include an ID and a password. In addition, in the case of a non-member, the identification information may include a user name, address, nationality, device used, authentication code, and the like.

When the user accesses the application 134 after the license period expires, the application 134 may output a message to the user terminal indicating that the license period has expired. When the application 134 receives a license re-issuance request signal from the user terminal 140, the processing unit 2 132 may transmit a signal to the processing unit 1 114 to request re-issuance of the license.

The processing unit 1 114 that receives the signal for requesting re-issuance of the license may transmit a signal to the administrator terminal 150 to request re-issuance of the license. The administrator terminal 150 that receives the signal for requesting re-issuance of the license may transmit a license re-issuance signal to the processing unit 1 114. The processing unit 1 114 that receives the license re-issuance signal may issue a license that corresponds to user information. The processing unit 1 114 may transmit the issued license to the processing unit 2 132. The processing unit 2 132 may copy the license received from the processing unit 1 114. In addition, the processing unit 2 132 may store the license file received from the processing unit 1 114 in the application 134. The VM interface 130 may transmit the fifth message including the information about the completion of issuance of the license to the processing unit 1 114.

When the license period expires, the processing unit 1 114 may transmit a signal to the administrator terminal 150 indicating that the license period has expired. The administrator terminal 150 which receives the signal indicating that the license period has expired may transmit a license discard signal to the processing unit 1 114. The processing unit 1 114 which receives the license discard signal may transmit the license discard signal to the license processing unit 2 132. The processing unit 2 132 which receives the license discard signal may discard the license stored in the VM interface 130.

Figure 7:
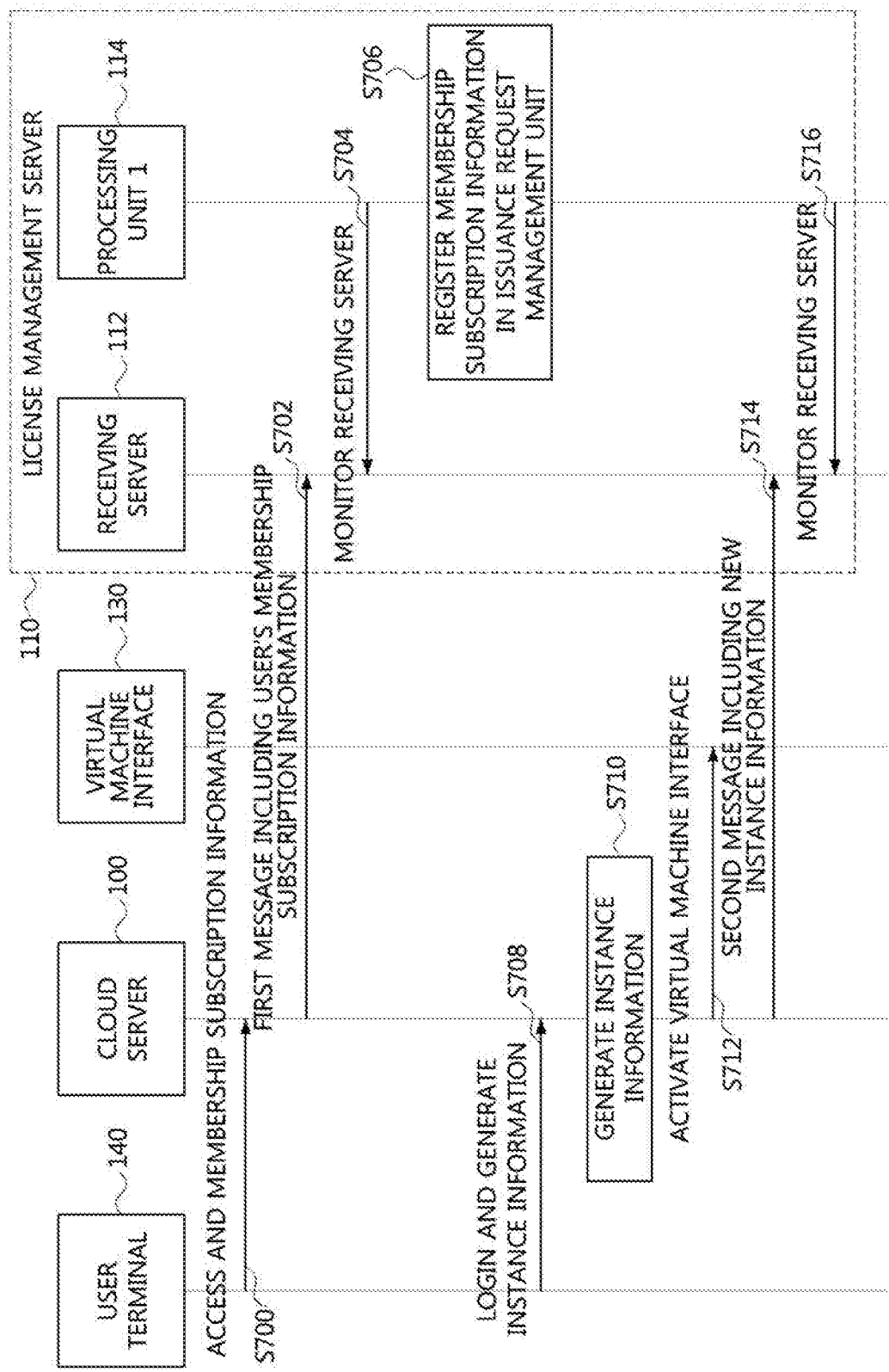
FIG. 7 is a flowchart illustrating a process of transmitting information necessary for issuing a license to a license management server.

FIG. 7 is a flowchart illustrating a process of transmitting information necessary for issuing a license to a license management server.

Referring to FIG. 7, the process illustrated in FIG. 7 may be a process of monitoring, by the license management server 110, membership subscription information transmitted from the user terminal 140 to the cloud server 100 and instance information in a method of issuing a license.

Specifically, the user terminal 140 may access the cloud server 100. The user terminal 140 may transmit the membership subscription information including the user's identification information to the cloud server 100 (S700). The cloud server 100 may receive the membership subscription information including the user's identification information from the user terminal 140.

In the case of a user registered as a member, the identification information may be an ID and a password. In addition, in the case of a non-member, the identification information may include a user name, address, nationality, a device used, authentication code, a bank name, bank account number, and the like. The cloud server 100 may transmit a first message including user's membership subscription information to the receiving server 112 of the license management server 110 (S702).

The receiving server 112 may receive the first message including the user's membership subscription information from the cloud server 100. The processing unit 1 114 of the license management server 110 may monitor whether the receiving server 112 receives the first message (S704).

When the receiving server 112 receives the first message, the processing unit 1 114 may register the membership subscription information in an issuance request management unit (S706). The user terminal 140 may access the cloud server 100 and transmit information necessary for generating an instance identified by the user identification information to the cloud server 100 (S708).

The cloud server 100 may receive the information necessary for generating an instance identified by the user identification information from the user terminal 140. When the cloud server 100 receives the information necessary for generating an instance identified by the user identification information from the user terminal 140, the cloud server 100 may generate instance information on the basis of the received information necessary for generating an instance (S710). In this case, the instance information may be identification information of the VM interface 130.

The processing unit 3 of the cloud server 100 may check user's payment information. When the payment information is valid and a predetermined payment amount is deposited into an account of the user terminal 140, the processing unit 3 may generate an existing instance corresponding to the deposited amount. The cloud server 100 may check the user's account information and, when the payment information is not valid, may not generate an instance.

When information identified by the user identification information is a registered identifier, the cloud server 100 may activate the VM interface 130 for the user identified by the user identification information (S712).

The cloud server 100 may transmit a second message including new instance information to the receiving server 112 (S714). The receiving server 112 may receive the second message including the new instance information from the cloud server 100.

The second message may include a signal for requesting issuance of a license. The processing unit 1 114 of the license management server 110 may monitor whether the receiving server 112 receives the second message (S716).

Figure 8:
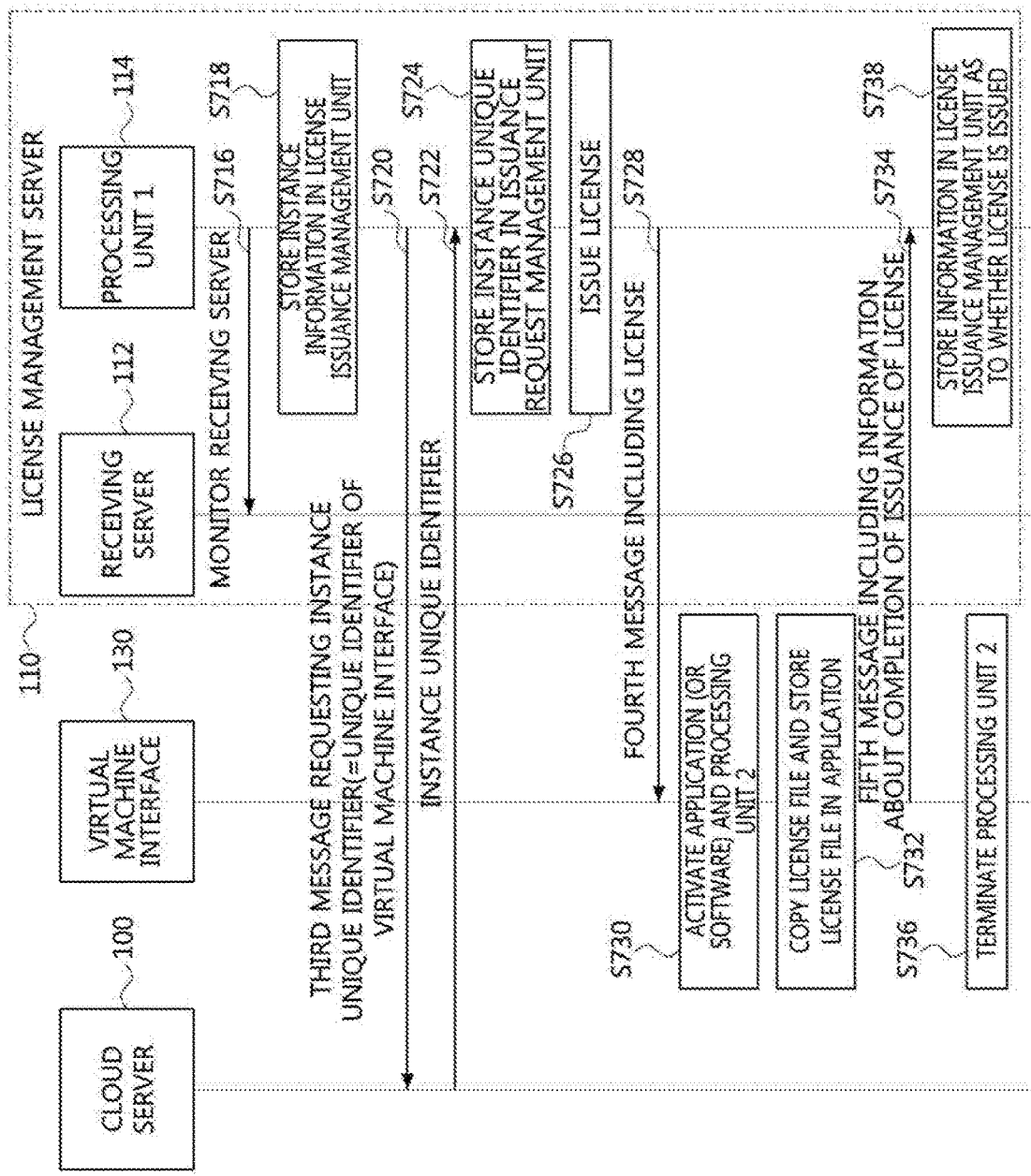
FIG. 8 is a flowchart illustrating a process in which an application (or software) is activated through issuance of a license.

FIG. 8 is a flowchart illustrating a process in which an application (or software) is activated through issuance of a license.

Referring to FIG. 8, the process illustrated in FIG. 8 may be a process of activating, by the license management server 110, the VM interface 130 on the basis of monitored membership subscription information and instance information in a method of issuing a license.

Specifically, a license issuance management unit may store instance information. The processing unit 1 114 of the license management server 110 may monitor whether the receiving server 112 receives the second message (S716). When the receiving server 112 receives the second message, the processing unit 1 114 may store the new instance information included in the second message received by the receiving server 112 in the license issuance management unit (S718). Pieces of stored information may be used as big data.

The processing unit 1 114 of the license management server 110 may transmit the third message to the cloud server 100 to request an instance unique identifier (S720). The cloud server 100 may receive the third message that requests the instance unique identifier from the processing unit 1 114.

In response to the third message, the cloud server 100 may transmit the instance unique identifier to the processing unit 1 114 of the license management server 110 (S722). The processing unit 1 114 may receive the instance unique identifier, which is a response to the third message, from the cloud server 100.

When the processing unit 1 114 receives the instance unique identifier corresponding to the third message from the cloud server 100, the processing unit 1 114 may store the instance unique identifier received from the cloud server 100 in the issuance request management unit (S724). Pieces of stored instance unique identifier information may be used as big data.

When the processing unit 1 114 receives the instance unique identifier from the cloud server 100, the processing unit 1 114 issues a license through the license issuance management unit on the basis of the new instance information of the license issuance management unit (S726). When the license is issued, the processing unit 1 114 may transmit a fourth message including the issued license to the VM interface 130 (S728).

The VM interface 130 may receive the fourth message including the issued license from the processing unit 1 114. The VM interface 130 that receives the fourth message may activate an application. In addition, the VM interface 130 that receives the fourth message may activate the processing unit 2 of the VM interface 130 (S730).

The processing unit 2 of the VM interface 130 may copy a license file received from the processing unit 1 114. In addition, the processing unit 2 may store the license file received from the processing unit 1 114 in the application (S732). The VM interface 130 may transmit the fifth message including information about the completion of issuance of the license to the processing unit 1 114 (S734).

When the processing unit 2 transmits the fifth message including the information about the completion of issuance of the license to the processing unit 1 114, the processing 2 may be terminated (S736).

When the processing unit 1 114 receives the fifth message, the processing unit 1 114 may store information on whether a license is issued in the license issuance management unit. The information on whether a license is issued may be represented as license issued, license not-issued, or the like in the license issuance management unit (S738).

Figure 9:
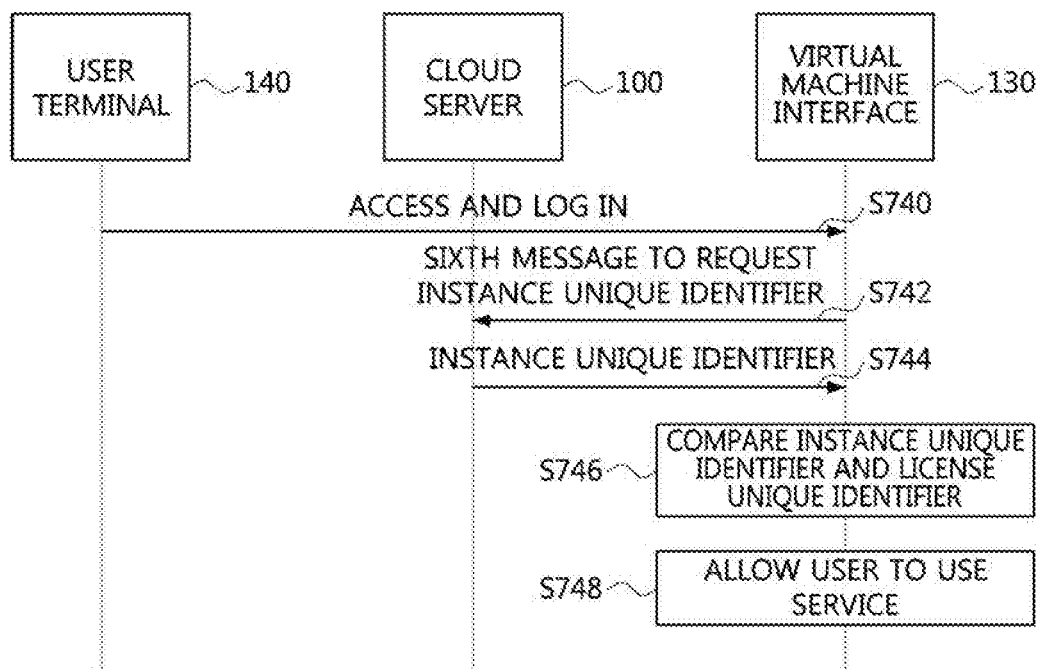
FIG. 9 is a flowchart illustrating a process performed until the user terminal uses a service after a license is issued.

FIG. 9 is a flowchart illustrating a process performed until the user terminal uses a service after a license is issued.

Referring to FIG. 9, the process illustrated in FIG. 9 is a process of accessing, by the user terminal 140, the VM interface 130 to be provided with a desired service in a method of issuing a license. Specifically, the user terminal 140 may access the VM interface 130 and log in (S740).

When the user terminal 140 accesses the VM interface 130, the VM interface 130 may transmit a sixth message to the cloud server 100 to request an instance unique identifier (S742). The cloud server 100 may receive the sixth message which requests the instance unique identifier from the VM interface 130.

The cloud server 100 may transmit the instance unique identifier to the VM interface 130 in response to the sixth message (S744). The VM interface 130 may receive the instance unique identifier corresponding to the sixth message from the cloud server 100.

An application operated in the VM interface 130 may compare the instance unique identifier (a unique identifier of the VM interface) and a unique identifier of the VM interface 130 included in a license and may determine whether the instance unique identifier is identical to the unique identifier of the VM interface 130 (S746). When the instance unique identifier is identical to the unique identifier of the VM interface 130 included in the license, the application may be operated (S748). When the instance unique identifier is not identical to the unique identifier included in the license, the application may not be operated.

The processing unit 1 114 may perform a procedure for issuing a license only when a request for a license is received from the VM interface 130. In this case, since the risk of backdoor is small, operation S738 (in which the processing unit 2 is terminated) may not be performed.

A backdoor is deliberately built by a system designer for the convenience of access to another personal computer (PC) for service technicians or maintenance programmers. Recently, a backdoor is used as a term referring to a part vulnerable to hacking.

The first message, the second message, and the fifth message are stored in a database included in the license management server 110 and the database may support an API.

FIG. 10 is a flowchart illustrating a method of re-issuing a license.

Referring to FIG. 10, when a user accesses an application after the license period expires, the application may output a screen to inform the user that the license period has expired. When the application receives a license re-issuance request signal from the user, a license management server 110 may transmit a signal including a seventh message to processing unit 1 114 to request re-issuance of a license (S750).

The processing unit 1 114 which receives the signal for requesting re-issuance of a license may transmit a signal including the seventh message that requests re-issuance of a license to an administrator terminal 150 (S752). The administrator terminal 150 which receives the signal for requesting re-issuance of a license may transmit a signal including an eighth message, which is a license re-issuance signal, to the processing unit 1 114 (S754).

The processing unit 1 114 which receives the license re-issuance signal may issue a license corresponding to user information through a license issuance management unit (S756). The processing unit 1 114 may transmit the eighth message including the issued license to a VM interface 130 (S758). The VM interface 130 may activate an application and processing unit 2 (S760).

The processing unit 2 may copy the license file received from the processing unit 1 114. In addition, the processing unit 2 may store the license file received from the processing unit 1 114 in the application (S762). The processing unit 2 may transmit a signal including a ninth message, which is information about the completion of issuance of a license, to the processing unit 1 114 (S764). When the processing unit 2 transmits the ninth message including the information about the completion of issuance of a license to the processing unit 1 114, the processing unit 2 may be terminated (S766).

When the license period expires, the processing unit 1 114 may transmit a signal to the administrator terminal 150 indicating that the license period has expired (indicating that the user does not want to re-issue the license). The administrator terminal 150 which receives the signal indicating that the license period has expired may transmit a license discard signal to the processing unit 1 114.

The processing unit 1 114 which receives the license discard signal may transmit the license discard signal to the license management server 110. The license management server 110 which receives the license discard signal may discard the license stored in the VM interface 130.

The method according to the present invention may be realized in a program command (or instruction) format that may be executed by diverse computing units so as to be recorded in a computer-readable medium. Herein, the computer-readable medium may include each or a combination of a program command (or instruction), a data file, a data structure, and so on. The program command recorded in the medium may correspond to a program command that is specifically designed and configured for the exemplary embodiments of the present invention, or the program command may correspond to a program command that is disclosed and available to anyone skilled in the art of computer software.

Examples of the computer-readable recording medium may include magnetic media such as hard discs, floppy discs, and magnetic tapes, optical media such as CD-ROMs, DVDs, and so on, magneto-optical media such as floptical discs, and hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-described hardware equipment may be configured to be operated as one or more software modules for executing the operations of the exemplary embodiment of the present invention, and vice versa.

While the present invention has been particularly shown and described with reference to the exemplary embodiments thereof, it will be understood by those of ordinary skill in the art that various changes in form and details may be made therein without departing from the spirit and scope of the present invention as defined by the following claims.

The invention claimed is:

1. A method of servicing software using a license management server of a service providing company, the method comprising:

receiving a virtual machine interface from a cloud server of a cloud providing company;

installing the software of the service providing company in the virtual machine interface;

providing authority related to an ID and a password to a user terminal;

servicing the software at the user terminal through the virtual machine interface when the user terminal accesses the software; and transmitting a license for authenticating authority for use of the software to the virtual machine interface, wherein prior to the transmitting of the license for authenticating authority for use of the software to the virtual machine interface:

receiving a first message including user's membership subscription information from the cloud server and registering the membership subscription information in an issuance request management unit;

receiving a second message that indicates new instance information identified by user identification information from the cloud server and updating source instance information stored in a license issuance management unit to the new instance information;

transmitting a third message to the cloud server to request an instance unique identifier;

receiving the instance unique identifier from the cloud server;

updating instance unique identifier information in the issuance request management unit to the instance unique identifier received from the cloud server; and issuing the license through the license issuance management unit.

2. The method of claim 1, wherein the transmitting the license to the virtual machine interface in order to authenticate the user terminal for the authority is related to the ID and the password.

3. The method of claim 2, wherein the authority related to the ID and the password is provided when a payment for use of the software is made.

4. The method of claim 1, further comprising, when a request for issuance of a new license is received from the user terminal after the license expires, re-providing the authority related to the ID and the password.

5. The method of claim 1, wherein, when a request for issuance of a new license is not received from the user terminal after the license expires, the ID and the password for accessing the software are discarded.

6. A method of servicing a software using of a license management server of a service providing company, the method comprising:

receiving a first message including user's membership subscription information from a cloud server and registering the membership subscription information in an issuance request management unit;

receiving a second message that indicates new instance information identified by user identification information from the cloud server and updating source instance information stored in a license issuance management unit to the new instance information;

transmitting a third message to the cloud server to request an instance unique identifier;

receiving the instance unique identifier from the cloud server;

updating instance unique identifier information in the issuance request management unit to the instance unique identifier received from the cloud server;

issuing a license for authenticating authority to use the software through the license issuance management unit; and transmitting the license to a virtual machine interface of the cloud server, wherein the software is provided to a user terminal through the virtual machine interface.

7. The method of claim 6, further comprising, when the license is transmitted to the virtual machine interface, receiving a fourth message that indicates completion of issuance of the license from the virtual machine interface.

* * * * *